(12) United States Patent
Gil Brugalla

(10) Patent No.: US 9,752,041 B2
(45) Date of Patent: Sep. 5, 2017

(54) SOLID TEMPERA AND METHOD FOR MANUFACTURING SAME

(71) Applicant: Grup 8, S.A., Barcelona (ES)

(72) Inventor: Enrique Gil Brugalla, Barcelona (ES)

(73) Assignee: GRUP 8, S.A., Barcelona (ES)

( * ) Notice: Subject to any disclaimer, the term of this patent is extended or adjusted under 35 U.S.C. 154(b) by 34 days.

(21) Appl. No.: 14/892,022

(22) PCT Filed: Nov. 11, 2013

(86) PCT No.: PCT/ES2013/070777
§ 371 (c)(1),
(2) Date: Nov. 18, 2015

(87) PCT Pub. No.: WO2014/195532
PCT Pub. Date: Dec. 11, 2014

(65) Prior Publication Data
US 2016/0108273 A1    Apr. 21, 2016

(30) Foreign Application Priority Data

May 6, 2013  (ES) .................................. 201330829

(51) Int. Cl.
*C09D 5/00* (2006.01)
*C08J 3/20* (2006.01)
(Continued)

(52) U.S. Cl.
CPC .............. *C09D 13/00* (2013.01); *C08J 3/203* (2013.01); *C09D 5/00* (2013.01); *C08J 2329/04* (2013.01);
(Continued)

(58) Field of Classification Search
None
See application file for complete search history.

(56) References Cited

U.S. PATENT DOCUMENTS 4,808,227 A * 2/1989 Yuasa ................ B41M 5/38221
                                                           106/31.62
4,830,670 A * 5/1989 Danyu .................... C09D 11/18
                                                           260/DIG. 38
(Continued)

FOREIGN PATENT DOCUMENTS

CN    102127344 A    7/2011
CN    102533006 A    7/2012

OTHER PUBLICATIONS

International Search Report, dated Mar. 21, 2014.

*Primary Examiner* — Peter A Salamon
(74) *Attorney, Agent, or Firm* — Jacobson Holman, PLLC.

(57) ABSTRACT

The present invention relates to a solid tempera and to the method for manufacturing the same, which includes a dispersion of resin having a concentration value of 10% to 70%, sodium stearate having a concentration of 10% to 20%, glycerine having a concentration value of 4% to 20%, water having a concentration of 7% to 50%, a pigment having a concentration value of 5% to 15%, an anti-foaming agent having a concentration of 1% to 3%, and a biocide having a concentration of 0.10% to 0.4%, the above concentration values relating to the final product. The tempera of the invention is used for painting or drawing on a substrate such as paper, Bristol board, wood or cardboard, being applied directly to said substrates without having to add water.

9 Claims, 1 Drawing Sheet

(51) Int. Cl.
  *G03C 1/00* (2006.01)
  *C09D 13/00* (2006.01)
  *C08K 5/00* (2006.01)
  *C08K 5/053* (2006.01)
  *C08K 5/098* (2006.01)
  *C08K 5/47* (2006.01)

(52) U.S. Cl.
  CPC ......... *C08J 2339/06* (2013.01); *C08K 5/0041* (2013.01); *C08K 5/0058* (2013.01); *C08K 5/053* (2013.01); *C08K 5/098* (2013.01); *C08K 5/47* (2013.01)

(56) References Cited

U.S. PATENT DOCUMENTS

| | | | | |
|---|---|---|---|---|
| 4,992,502 | A * | 2/1991 | Loftin | C09D 10/00 523/161 |
| 5,236,494 | A * | 8/1993 | Kano | C09D 13/00 106/437 |
| 5,403,872 | A * | 4/1995 | Koreska | C08K 3/22 106/271 |
| 5,702,513 | A * | 12/1997 | Causton | C09D 13/00 106/31.93 |
| 5,730,788 | A * | 3/1998 | Gil Soriano | C09D 13/00 106/31.01 |
| 6,025,413 | A * | 2/2000 | Xu | C09D 10/00 523/161 |
| 2006/0210924 | A1* | 9/2006 | Fukuo | C09D 7/007 430/270.1 |

* cited by examiner

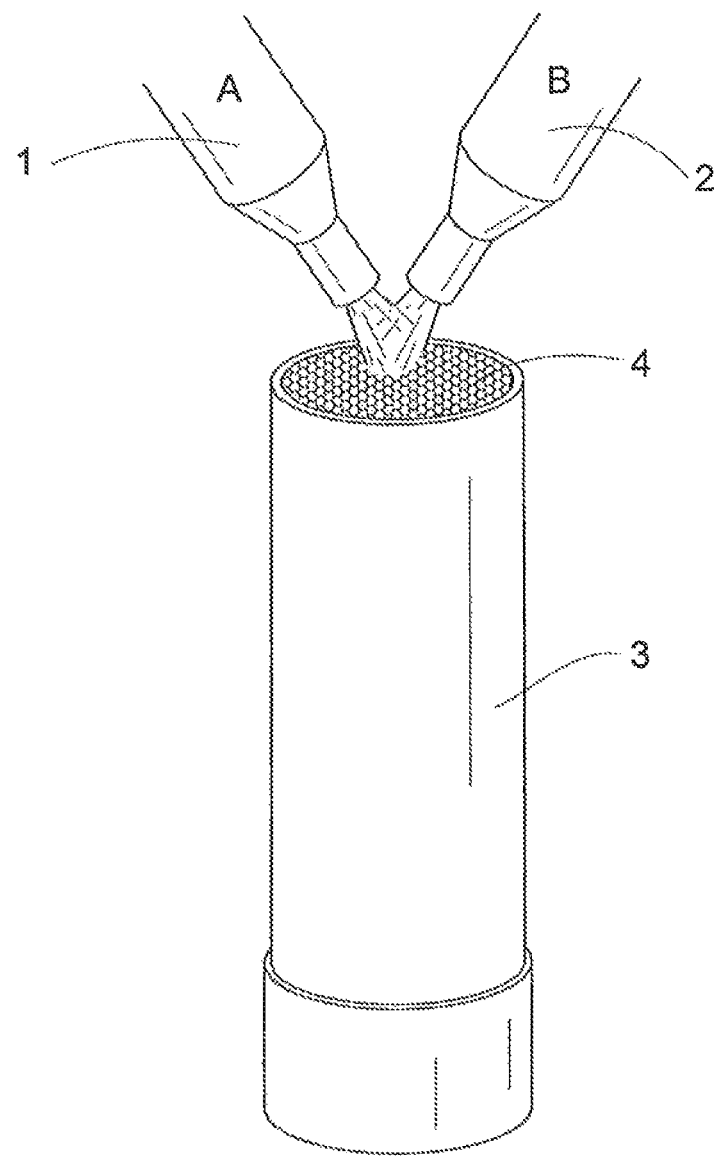

SOLID TEMPERA AND METHOD FOR MANUFACTURING SAME

OBJECT OF THE INVENTION

One of the objects of the invention is to provide a solid paint or tempera of those used for painting or drawing on a substrate such as paper, Bristol board, wood, cardboard, which is to be applied in a direct manner without adding water, being dimensionally stable and readily dispersible on the substrates when submitted to a low mechanical effort.

Another objective of the present invention is to provide a method for manufacturing said solid tempera, which in its application forms a fast drying covering film, with high covering capacity, having a stable conservation after its manufacturing and packaging.

FIELD OF THE INVENTION

The present invention is related to solid covering compositions, and particularly to solid paint or tempera compositions for drawing on paper, Bristol board, wood and cardboard.

STATE OF THE ART

Multiple embodiments of solid paints for drawing or painting on paper, cardboard or similar substrates exist nowadays on the market, which may be considered as part of the state of the art.

On the other hand, it is known that the usual method for the manufacturing of this type of tempera consists in mixing pigments and resins with stirring under hot conditions, obtaining an homogeneous mix which will be filled in containers. This usual manufacturing method has the drawback that it results in an excessively solid tempera due to the fact that the method enhances the homogenization of the resins with the pigments and with other usual components such as the solidifying agents, provoking in this case an excessive solidification of the product, requiring a substantial mechanical effort for the application of the tempera, which entails that in some occasions the substrate on which the tempera is applied may be broken or in other cases the solution of the solidifying agent, turns to be difficult causing a weak cross-linking and therefore an inadequate solidification of the solid tempera.

Therefore, there is an obvious need to provide a solid tempera which disperses easily on the substrate, forming a film with a substantial covering capacity, with the possibility to obtain different colour hues by means of the superposition of layers, having fast drying properties and that, in spite of being solid, requires only a low mechanical effort to disperse on said substrates.

DESCRIPTION OF THE INVENTION

The present invention refers to a solid paint or tempera of the type used for painting or drawing on a substrate such as paper, Bristol board, wood, cardboard, to be directly applied on said substrate without the need to add water.

Essentially the solid tempera of the invention comprises a resin dispersion with a concentration between 10% and 70% in weight of the final product, sodium stearate with a concentration between 10% and 20% of the final product, glycerine with a concentration between 4% and 20%, water with a concentration between 7% and 50%, a pigment with a concentration between 5% and 15%, an anti-foaming agent with a concentration between 1% and 3%, and finally a biocide with a concentration between 0.10% and 0.40%, all of the concentrations being referred to the final product.

The solid tempera of the invention turns out to be a sufficiently solid product maintaining stably its dimensions within a given temperature range, which permits to maintain its form and enjoy an stable conservation after its manufacture and packaging.

Said solid tempera results at the same time in a product which may be dispersed on a substrate in an easy manner, forming a film with a high covering capacity with the possibility to obtain different colour hues by the superimposition of layers, drying very rapidly and requiring in spite of being solid, only a very low mechanical effort for dispersing on said substrates.

To obtain the best results in the application of the invention, the solid tempera comprises a resin used as binding agent or film forming agent. Said resin must contribute the sufficient initial adhesion and binding capacity to permit at the same time easy sliding and sufficient adhesion to be able to superimpose moist layers of paint (before drying) and to obtain a high covering capacity permitting colour effects similar to those obtained with oil paints.

Said resin will be used, as above mentioned, with a concentration between 10% and 70% in weight of the final product. Preferably, the resin will have a concentration comprised between 10% and 25% in weight of the final product if said resin is used in solid state, and will have a concentration comprised between 40% and 70% of resin if it is used as a dispersion at 40%-70% solid matter.

The adequate choice of the resin will determine in a great measure the correct performance of the solid tempera of the invention permitting the tempera to be easily applied and adequately dispersing on the substrate.

Thus, for an adequate embodiment of the invention, the resin will be selected within the group formed by the following polymers: polyvinyl pyrrolidone k80-k90, wherein k refers to the molecular weight of the polymer, polyvinyl alcohol preferably with an hydrolysis degree/99 (such as 17/99-28/99-65/99), a dispersion of a an acrylic resin soluble in alkalis, a dispersion of a vinyl styrene resin with 40%-50% of solid matter, and a polyvinylacetal resin.

Preferably, the resin to be employed will be polyvinylacetal, resulting from the modification of polyvinyl alcohol (PVA) in an appropriate rate with an aldehyde in the presence of an acid, being the aldehyde preferably formaldehyde or acetaldehyde, used with concentrations between 1%-15%.

On the other hand, the solid tempera composition of the invention incorporates sodium stearate which will be used preferably as solidifying agent. This latter will permit to form a solid structure maintaining together all of the elements or compounds forming the composition, or to keep it sufficiently solid with a hardness range such as to provide the desirable dimensional stability of the tempera. However, the quantity to be used has to be such as to permit that the solid tempera of the invention may be applied and dispersed on the substrate in an easy and gentle manner, requiring a low mechanical effort in order that the solid body of the tempera disperses distributing a fine layer of paint on said substrate. In this connection, the sodium stearate will be preferably employed with a concentration between 10% and 20% of the final product, and more preferably between 12% and 15%.

Although preferably the solid tempera composition of the invention comprises sodium stearate, it is important to remark that other fat acids salts may be used in the composition with similar results.

The pigments, in its turn, will be used in the invention to obtain the desired colour, being added to the paint by conventional methods. The pigments will be added to the solid tempera of the invention with a concentration of 7%-12% referred to the final product, and preferably the pigments may be of organic, inorganic or metallic nature, not containing heavy metals to fulfill the current legal provisions, especially for children use, being said pigments suitable to be mixed together to obtain the desired colour and shade.

The anti-foaming agent will be used to prevent the formation of foam in the preparation of the mixed compositions and in the pressure dispensation of the product and also to obtain the final product without air bubbles which could damage the consistency of the bar of tempera, hindering its use.

The anti-foaming agent will be selected mainly within the group of silicone dispersions usually with 10% approximately of solid matter.

Additionally, the solid paint composition of the invention includes the use of the biocide, aimed at preventing contamination by germs, such as bacteria, fungi or yeasts. Said biocide is preferably used with a concentration between 0.10% and 0.40% of the final product. This biocide, given the manufacturing method of said solid paints (tempera), should support without decomposition the conditions for the preparation of mixed compositions carried out at high temperatures, up to 90° C., and also with high pH values, approximately up to pH 13.

Preferably the biocide has to be of the type of a methyl or ethyl para-hydroxybenzoate (parabene), and preferably a combination of benzisothiazolone and phenoxyethanol.

Another objective of this invention is to provide a method for the manufacture of said solid tempera, in order the tempera to be dimensionally stable, having the capacity to disperse easily forming a covering film with fast drying capacity, high covering power and stable conservation after its manufacture and packaging.

The traditional methods knows so far for the manufacture of tempera proceed normally to the hot mixing with stirring of all the components of the composition for the tempera, to be deposited afterwards into the corresponding containers.

The method of the present invention for the manufacture of solid tempera permits to obtain a product with high performance and surprising results in its applications thanks to the implementation of a method giving especial importance to the mixing of the components forming the composition of the tempera.

Essentially, the method of the manufacture of solid tempera of the present invention comprises preferably the following steps:

i—to provide a mix A comprising pigments, sodium stearate, glycerine and water;

ii—to provide a mix B comprising a concentrated solution of resin in water, being the resin selected within the group formed by polyvinyl pyrrolidone, polyvinylalcohol, alkali soluble acrylics, vinyl styrene, polyvinylacetal;

iii—to separately heat the two mixed components A and B to a temperature in the range of 60-90° C.;

iv—to mix by simultaneous addition the solutions A and B obtained in steps i and ii, within a mould or container, obtaining the final mix C, said mix C containing both mixed compounds A and B in an approximate relation 1:1 depending on the resins employed, with a concentration range of (40-60%) and solution B also with a concentration of (40-60%);

v—cooling and solidification of the resulting mix C to form a dimensionally stable solid tempera, so that under a low mechanical effort said solid tempera has the capacity to disperse easily on a surface or substrate such as paper, Bristol board, wood or cardboard;

After a substantial, experimentation, surprising and unexpected results have been obtained concerning the application of the tempera of the invention when the filling of the containers is carried out with the previous preparation of the components of the tempera separately in two solutions, so that said solutions are mixed under heating and solidify simultaneously.

The mix of the solutions A and B in the mould or container is carried out without stirring and within a time span of 0.5 seconds-2 seconds, so that the resulting mixing velocity prevents the total homogenization of both solutions A and B object of the mix, preventing at the same time the total homogenization of the sodium stearate within the final mix, being sufficient at the same time to obtain an adequate consistency and the desired effect of microphase mix for an smooth and satisfactorily spreading application.

In this connection, it is important to mention that the mix of the solutions A and B to the above mentioned speed, has to be carried out so that a certain turbulence is created in order to obtain that the mixed portions of the solutions A and B are sufficiently small to obtain a sufficient heterogeneity of the mixed solutions.

To obtain the desired effects, the cooling and solidification step of the mix has to be carried out during a period of 5 to 10 seconds, submitting the packaged mix C to a flow of cool air to a temperature of −10° C. to −20° C., so that said solidifying velocity prevents the total homogenization of both mixed compounds A and B to be mixed and that additionally the sodium stearate has sufficient time to form a crosslinked structure not contributing an excessive solidity to the tempera of the invention.

In this way, and although no limitation from theory is desired, it is considered that the filling of the container with both solutions A and B, which are mixed in warm state solidifying rapidly a final product is obtained with two phases mixed under turbulence, creating an heterogeneous mix or in other words, an homogeneous mix of microphases.

In the event of application of a bar of solid tempera according to the invention to a substrate a microphase of a resin is applied in which the product sticks to the substrate depositing a gelatinous layer capable to absorb the pigment of the other immediately adjacent microphase, creating a film covering the substrate with uniform colour and great covering capacity, creating a relief and 3D effect which would not be obtained if the method would be carried out according to the conventional methods starting from a completely homogeneous one phase mix.

Concerning the step or phase of cooling down and solidification, said step it is carried out directly in the container, mould, flask or receptacle, so that after cooling the mass of the solid tempera adopts the desired form being ready for use.

The containers to be used are preferably those permitting a direct application of the product such as a rotating bars commonly knows as "sticks".

The application of the solid tempera with the composition defined in the present invention and produced by means of the above described method, is adequate for substrates such as paper, Bristol board, wood, carton and it is carried out directly on said substrates without the need to add water.

Said application permits to form a moist covering film with a great covering capacity and colour effects similar to those obtained with oil paints, with a bright finishing and fast drying, which does not wrinkle the paper during its application.

Other details and characteristics will be evidenced in the description to be made in the following, which refers, in a non-limitative way, to an example of embodiment of the invention to be explained with the assistance of the correspondence drawing.

The description of the different parts identified in the drawing will be made according to the following references: (1) dispensing container with solution A, (2) dispensing container with solution B, (3) container, (4) mix C.

DESCRIPTION OF THE DRAWING

FIG. 1 corresponds to a diagrammatic illustration showing the step of mixing solutions A and B into the container.

PREFERRED EMBODIMENT OF THE INVENTION

As above mentioned a solid tempera according to the present invention, to be used for painting or drawing on paper, Bristol board, wood, cardboard, is to be directly applied without the need to add water, comprising a resin with a concentration between 10% and 25% of solid resin, or 40-70% of resin in dispersion of 40-50% of solid matter, sodium stearate with a concentration between 10% and 20%, glycerine with a concentration between 4% and 20%, water with a concentration between 7% and 50%, pigment with a concentration between 5% and 15%, anti-foaming agent with a concentration between 1% and 3%, and finally a biocide with a concentration between 0.10% and 0.40%, said concentration amounts being referred to the final product.

The method for the manufacture of the solid tempera explained in the examples was carried out according the above explained new method, consisting in the preparation of a mix "A" comprising the quantities of pigment, sodium stearate, wetting agents, glycerine and water needed for the formulation of the final product of the solid tempera. At the same time, the mix "B" is prepared comprising a concentrated solution of the specific resin in water, wherein the resin is selected within the group formed by: polyvinyl pyrrolidone, polyvinylalcohol, alkali soluble acrylics, vinyl styrene, polyvinylacetal. Both solutions are preferably prepared in containers with stirring, having heating means.

After the preparation of the two solutions "A" and "B", these are heated up to a temperature of 70° C. After reaching said temperature the solutions A and B are mixed by means of a simultaneous mixing action within a mould or container, so as to obtain a final mix "C" containing a solution A with a concentration of 40% to 60% and solution B with a concentration also of 40%60%.

The mixing of the solutions A and B within the mould or container has an especial importance in the performance of the invention as said mixing operation has to be carried out at a very fast speed, preferably within a period of time of less than 4 seconds, so that said velocity prevents the total homogenization of both solutions A and B to be mixed, permitting the sufficient dissolution of the sodium stearate.

Preferably, the mixing of said solutions A and B to the above mentioned speed has to be carried out so that a certain turbulence is created to provoke the portions effectively mixed between solutions A and B to be sufficiently small to obtain the sufficient heterogeneity between the solutions which are mixed (mix of microphases). In this connection, in FIG. 1 is shown the way in which solutions "A" and "B" have to be mixed to obtain the adequate results in the product of the invention. As is to be observed, a dispensing container (1) with the solution A and a dispensing containers (2) with solution B are provided, said dispensers pouring the respective solutions to the above mentioned velocities into container (3), forming the mix or solution "C".

In this case, the container is the same as the element to be used for the final application of the product.

After finishing the mixing operation of solutions A and B, the cooling down of the product and its solidification is carried out obtaining the resulting mix C, forming the solid tempera. The solidification of the mix is carried out within a period of time of 5 seconds, submitting the mix C already packaged to a cold air flow with a temperature between −10° C. and −20° C., so that a fast solidification may be obtained, to prevent the total homogenization of both solutions A and B after the mixing operation.

In the following, some compositions are shown as examples corresponding to the scope of the invention.

The solid tempera compositions of the following examples were prepared according to the method of manufacture of the invention.

Example 1

| | |
|---|---|
| Polyvinylpyrrolidone K-90 | 20% |
| Glycerine | 7% |
| Sodium stearate | 12% |
| Water | 50% |
| Red pigment dispersion | 9% |
| Silicone dispersion (10%) | 1.8% |
| Methylparabene | 0.2% |

Example 2

| | |
|---|---|
| Polyvinyl alcohol 17/99 | 10% |
| Glycerine | 7% |
| Sodium stearate | 12% |
| Water | 60% |
| Red pigment dispersion | 9% |
| Silicone dispersion (10%) | 1.8% |
| Methylparabene | 0.2% |

Example 3

| | |
|---|---|
| Polyvinylacetal (13%) | 60% |
| Glycerine | 7% |
| Sodium stearate | 12% |
| Water | 10% |
| Red pigment dispersion | 9% |
| Silicone dispersion (10%) | 1.8% |
| Methylparabene | 0.2% |

In Example 3, the polyvinylacetal is obtained by the reaction between polyvinyl alcohol (PVA) and a certain rate of formaldehyde or acetaldehyde. The reaction is to be carried out in very acid conditions with pH near to pH 2, under heating with a temperature near 90° C., during a time of 4 hours. In this case, for the formation of the polyvinylacetal the composition has 86.5% of water, 10% of polyvinylalcohol, 0.5% of HCl (conc. to 37%), and 3% of acetaldehyde.

An embodiment of a solid tempera formulated with a composition as shown in the above examples of embodiment and carried out with the manufacturing method of the invention permits to obtain a sufficiently solid product dimensionally stable within a given range of temperatures, which permits to maintain its shape and its stable conservation after its manufacture and packaging. Said product is adequate to be applied on substrates such as paper, Bristol board, wood, cardboard, being directly applied without the need of adding water.

Determination of Abrasion of the Solid Tempera by Weighing of the Tempera Tube.

As a comparison, tests were carried out to compare the application on a substrate of solid temperas manufactured by means of the method of the invention and other temperas manufactured by the traditional method.

The traditional method as mentioned hereabove, consisted usually in the hot mixing under stirring of all the components of the tempera in order to successively deposit the tempera into the packaging containers.

Said test consisted in the evaluation of the abrasion of the solid tempera by weighing the tempera tube, determining the amount of solid tempera applied on a substrate after application of a weight on said tempera paste.

The test was carried out according to the following process:

a) Preparation of 4 paper strips of 30×5 cm with a weight of 80 g/m².
b) Numbering and weighing separately in a precision balance, 4 tubes of solid tempera including the closing cap (weight=P1).
c) To arrange one of the strips on a DIN A4 sheet secured on the work table by means of adhesive tape.
d) To make the end of the tempera to protrude 5 mm, rotating the base of the tube.
e) To cut the tempera to the level of the tube edge with a knife.
f) To make the new end of the tempera to protrude 15 mm, rotating the base of the tube.
g) To introduce the tempera tube from the bottom part of the void cylinder of the tool to carry out abrasions, so that the paste contacts the paper strips.
h) To introduce the cylindrical weight of 1.5 kg by the top end of the void cylinder laying the same carefully on the inverted paste tube.
i) To make the paper strip to slide from one end to the other pulling with both hands during 15 seconds, repeating the process in the contrary direction in case of carrying out a test with 2 runs.
j) To weigh the used tube (weight=P2).
k) To evaluate the weight of the impregnated tempera (weight=P1−P2).
l) To express the results in mg of the impregnated tempera.

The equipment and reagents used in said test were a precision balance with a precision of 0.001 g, 80 g/m² DIN A4 paper, tooling to make the abrasions, a 1.5 kg weight and the product to be tested.

The test was carried out with three solid temperas prepared according to the method described in this invention, comprising a composition such as shown in Example 3 of the description, changing for each test the type of pigment used within the group of red, yellow and blue pigments but maintaining the same pigment concentration. For the three tempera manufactured according to the method of the prior art, the type of pigment was changed likewise.

The results obtained in the test are as shown in Table 1.

TABLE 1

|  | Amount of tempera impregnated in one run mg | Amount of tempera impregnated in two runs mg |
|---|---|---|
| Tempera (traditional method) Yellow pigment | 39 | 62 |
| Tempera (method according to the invention) Yellow pigment | 49 | 75 |
| Tempera (traditional method) Blue pigment | 37 | 61 |
| Tempera (method according to the invention) Blue pigment | 45 | 72 |
| Tempera (traditional method) Red pigment | 36 | 64 |
| Tempera (method according to the invention) Red pigment | 46 | 76 |

From the table showing the results is to be derived that using the solid tempera manufactured according to the method of the invention on a substrate, a greater amount of product will be impregnated on said substrate in comparison to the use of a tempera manufactured by the traditional methods, this demonstrating the better application of the tempera of the invention, its higher covering capacity and its easy dispersibility on said substrates. This fact is also evidenced in case of using various types of pigments in the manufacture of the tempera.

Therefore, the solid tempera of the invention permits to obtain a product allowing a satisfactory dispersibility, of the film obtained with high covering capacity and with the possibility to obtain different hues of colour by the superposition of layers of material, which dry very rapidly and that in spite of being solid, require a low mechanical effort to be dispersed on said substrates.

After having sufficiently described the present invention in relation with the examples shown, it is easy to understand that multiple modifications could be carried out in the same in the details deemed convenient, provided that the essentials of the invention, as defined in the following claims are not altered.

The invention claimed is:

1. A solid tempera, to be used for painting or drawing on paper, Bristol board, wood, cardboard, for direct application without the need to add water, wherein it comprises:
   a resin with a concentration between 10% and 70% in weight of the final product, selected within the group formed by: polyvinyl pyrrolidone k80-k90, wherein k refers to the molecular weight of the polymer, polyvinylalcohol preferably with an hydrolysis degree/99 (such as 17/99-65/99), and a polyvinylacetal resin, and sodium stearate with a concentration between 10% and 20%, glycerine with a concentration between 4% and 20%, water with a concentration between 7% and 50%, a pigment with a concentration between 5% and 15%, an anti-foaming agent with a concentration between 1% and 3%, and finally a biocide with a concentration between 0.10% and 0.40%, all of the concentrations being referred to the final product, and wherein the final product comprises the components in an homogeneous mix of two microphases, thereby, in use, a microphone of resin sticks to the substrate depositing a gelatinous layer that absorbs the pigment of the other immediately adjacent microphone, thus creating a film covering with uniform color and high covering capacity, a relief, and a 3D effect.

2. The solid tempera, according to claim 1, wherein the pigment may be an organic, inorganic or metallic pigment.

3. The solid tempera, according to claim 1, wherein the anti-foaming agent is selected within the group consisting in silicone water dispersions.

4. The solid tempera, according to claim 1, wherein the biocide is selected within the group comprising methyl or ethyl para-hydroxybenzoates (parabene).

5. The solid tempera, according to claim 1, wherein the biocide is a combination of benzisothiazolone and phenoxyethanol.

6. The solid tempera, according to claim 1, wherein it comprises polyvinylacetal with a concentration of 60%, glycerine with a concentration of 7%, sodium stearate with a concentration of 12%, water with a concentration of 10% and pigment with a concentration of 9%.

7. A method for manufacturing solid tempera, according to claim 1, characterized by the following steps:
   i—to provide a mix A comprising pigments, sodium stearate, glycerine and water;
   ii—to provide a mix B comprising a concentrated solution of resin in water, wherein the resin is selected within the group formed by polyvinyl pyrrolidone, polyvinylalcohol, polyvinylacetal;
   iii—to heat the two solutions A and B to a temperature comprised within 60-90° C.;
   iv—to mix by simultaneous addition the solutions A and B obtained in the steps i and ii, within a mould or container, obtaining the final mix C, containing solution A with a concentration of (40-60%) and solution B also with a concentration of (40-60%);
   v—solidification of the resulting mix C within the containers to form a dimensionally stable solid tempera, that under a low mechanical effort, has the capacity to easily disperse on a surface or substrate such as paper, Bristol board, wood or cardboard.

8. The method, according to claim 7, wherein the mix of the solutions A and B in the mould or container is carried out within a period of time comprised between 0.5 seconds and 2 seconds, so that the resulting mixing velocity prevents the total homogenization of both solutions A and B which are mixed together and at the same time prevents the total homogenization of the sodium stearate within the final mix.

9. The method, according to claim 7, wherein the solidification step of the mix is carried out during a period of time of 5 to 10 seconds, submitting the packaged mix C to a flow of cool air under a temperature comprised between −10° C. and −20° C., so that the solidifying prevents the total homogenization of both solutions A and B which are mixed.

* * * * *